United States Patent
Lin et al.

(10) Patent No.: US 11,386,030 B2
(45) Date of Patent: Jul. 12, 2022

(54) CONNECTION INTERFACE CONVERSION CHIP, CONNECTION INTERFACE CONVERSION DEVICE AND OPERATION METHOD

(71) Applicant: VIA LABS, INC., New Taipei (TW)

(72) Inventors: Cheng-Chung Lin, New Taipei (TW); Hsiao-Chyi Lin, New Taipei (TW); Yi-Shing Lin, New Taipei (TW); Chien-Sheng Chen, New Taipei (TW)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 17/110,301

(22) Filed: Dec. 3, 2020

(65) Prior Publication Data

US 2021/0271620 A1 Sep. 2, 2021

Related U.S. Application Data

(60) Provisional application No. 62/983,771, filed on Mar. 2, 2020.

(30) Foreign Application Priority Data

Oct. 6, 2020 (TW) .................................. 109134523

(51) Int. Cl.
  *G06F 13/38* (2006.01)
  *G06F 13/42* (2006.01)
(52) U.S. Cl.
  CPC ........ *G06F 13/382* (2013.01); *G06F 13/4282* (2013.01); *G06F 2213/0042* (2013.01)
(58) Field of Classification Search
  CPC ............... G06F 13/382; G06F 13/4282; G06F 2213/0042
  See application file for complete search history.

(56) References Cited

U.S. PATENT DOCUMENTS

2012/0307143 A1\* 12/2012 Yun ..................... G06F 3/1431
  348/460
2016/0112711 A1\* 4/2016 Hundal ............... G06F 13/4282
  375/240.26

(Continued)

FOREIGN PATENT DOCUMENTS

TW 201804737 2/2018
TW M610679 4/2021

OTHER PUBLICATIONS

"Office Action of Taiwan Counterpart Application", dated Nov. 26, 2021, p. 1-p. 15.

(Continued)

*Primary Examiner* — Henry Tsai
*Assistant Examiner* — Harry Z Wang
(74) *Attorney, Agent, or Firm* — JCIPRNET (57) ABSTRACT

A connection interface conversion chip, a connection interface conversion device and an operation method are provided. The connection interface conversion chip includes a USB interface circuit, a DP interface circuit, a USB core circuit and a switching circuit. The USB interface circuit is suitable for coupling to a USB connector. The DP interface circuit is suitable for coupling to a DP connector. In a first operation mode, at least one USB signal pair received by the USB connector is transmitted to the USB core circuit through the USB interface circuit. The USB core circuit decodes the USB signal pair and generates DP data. The DP data is transmitted to the DP connector by the DP interface circuit. In a second operation mode, the DP data received by the USB connector is transmitted to the DP connector through the USB interface circuit, the switching circuit and the DP interface circuit.

26 Claims, 5 Drawing Sheets

(56) References Cited

U.S. PATENT DOCUMENTS

2016/0127671 A1* 5/2016 Hundal ............ H04N 21/43632
                                                          348/723
2019/0317774 A1* 10/2019 Raghav ................ G06F 9/4406

OTHER PUBLICATIONS

Texas Instruments Incorporated, "TUSB564 USB Type-C™ DP Alt Mode 8.1 Gbps Sink-Side Linear Redriver Crosspoint Switch", TUSB564, Sep. 2019, pp. 1-51.
Stmicroelectronics, "STEVAL-USBC2DP Usb Type-C™ to DisplayPort™ adapter", User manual, UM2355-Rev 3, Jun. 2019, pp. 1-22.
Jim Choate, "Vesa—DisplayPortTM Alternate Mode on USB-C®", USB Implementers Forum, Nov. 2019, pp. 1-44.
Apple Inc et al., "Universal Serial Bus 4 (USB4™) Specification", USB 3.0 Promoter Group, Aug. 2019, pp. 1-569.

* cited by examiner

CONNECTION INTERFACE CONVERSION CHIP, CONNECTION INTERFACE CONVERSION DEVICE AND OPERATION METHOD

CROSS-REFERENCE TO RELATED APPLICATION

This application claims the priority benefit of U.S. provisional application No. 62/983,771, filed on Mar. 2, 2020 and Taiwan application no. 109134523, filed on Oct. 6, 2020. The entirety of each of the above-mentioned patent applications is hereby incorporated by reference herein and made a part of this specification.

TECHNICAL FIELD

The invention relates to an electronic circuit, and more particularly, to a connection interface conversion chip, a connection interface conversion device and an operation method.

BACKGROUND

A host and a device use the same transmission interface to transmit data to each other. When the transmission interface used by the host is different from the transmission interface used by the device, it is required to configure a connection interface conversion device between the host and the device, or to configure a connection interface conversion chip in the device. For instance, it is assumed that the transmission interface of the host is universal serial bus (hereinafter referred to as USB), and the transmission interface used by the device is display port (hereinafter referred to as DP). The connection interface conversion device (the connection interface conversion chip) can provide an interface conversion function to transmit data from a USB Type-C connector (a.k.a. a USB-C connector) of the host to a DP connector of a DP device, and (or) transmit data from the DP connector of the DP device to the USB-C connector of the host.

A USB-C connector of the connection interface conversion device is connected to the USB Type-C connector of the host. A first side of the USB-C connector includes a first transmitting pin (TX pin) pair and a first receiving pin (RX pin) pair, and a second side of the USB-C connector includes a second transmitting pin pair and a second receiving pin pair. In the case where the USB-C connector of the host operates in USB 3.2 specification, when a USB-C plug is inserted into the USB-C connector with a front side facing up, the first transmitting pin pair and the first receiving pin pair may be used as a communication channel of USB 3.2, whereas the second transmitting pin pair and the second receiving pin pair are idle. Conversely, when the USB-C plug is inserted into the USB-C connector with a back side facing up, the first transmitting pin pair and the first receiving pin pair are idle, whereas the second transmitting pin pair and the second receiving pin pair may be used as the communication channel of USB 3.2.

The host can operate in a display port alternative mode (a DP ALT Mode; hereinafter referred to as an ALT mode) compliant with USB specification (e.g., USB 3.2 specification). When the host operates in the ALT mode, the transmitting pin pair and the receiving pin pair which are idle in the USB-C connector of the host may be used to transmit data compliant with DP specification, and Side Band Use (hereinafter, referred to as SBU) pins may be used to transmit an auxiliary channel (hereinafter, referred to as a AUX channel) signal compliant with DP specification.

In the case where the USB-C connector of the host operates in USB 4.0 specification, the first transmitting pin pair and the first receiving pin pair of the first side of the USB-C connector and the second transmitting pin pair and the second receiving pin pair of the second side of the USB-C connector may all be used as a communication channel of USB 4.0. When the USB-C connector of the host transmits signals compliant with USB 4.0 specification, the SBU pin of the USB-C connector of the host is used to transmit a side band signal compliant with USB specification. When the USB-C connector of the host operates in USB 4.0 specification, the host can use a DP tunneling protocol compliant with USB 4.0 specification to encode DP data compliant with DP specification and the AUX channel signal into a USB 4.0 signal streaming.

A DP connector of the connection interface conversion device is connected to the DP connector of the DP device. Regardless of whether the USB-C connector of the host operates in the ALT mode or operates in USB 4.0, the connection interface conversion device (the connection interface conversion chip) needs to be capable of processing the signal from the USB-C connector of the host, so as to transmit the DP data from the host to the DP device.

It should be noted that, the content in the paragraph "Description of Related Art" are intended to assist understanding the invention. Part of the content (or all content) disclosed in the paragraph "Description of Related Art" may not be the conventional technology known by a person of ordinary skill in the art. The content disclosed in the paragraph "Description of Related Art" may not mean the content is known by a person of ordinary skill in the art before application of the invention.

SUMMARY

The invention provides a connection interface conversion chip, a connection interface conversion device and an operation method capable of processing a signal of a universal serial bus (hereinafter, referred to as USB) connector regardless of whether the signal of the USB connector is a signal compliant with a display port alternative mode (a DP ALT Mode; hereinafter referred to as an ALT mode) of USB specification (e.g., USB 3.2 specification) or a signal compliant with a DP tunneling protocol of USB 4.0 specification.

In an embodiment of the invention, the connection interface conversion chip includes a USB interface circuit, a DP interface circuit, a USB core circuit and a switching circuit. The USB interface circuit is suitable for coupling to a USB connector. The DP interface circuit is suitable for coupling to a DP connector. The USB core circuit is coupled to the USB interface circuit and the DP interface circuit. The switching circuit is coupled to the USB interface circuit and the DP interface circuit. In a first operation mode, at least one USB signal pair received by the USB connector is transmitted to the USB core circuit through the USB interface circuit. The USB core circuit decodes the USB signal pair and generates DP data. The DP data is transmitted to the DP connector by the DP interface circuit. In a second operation mode, the DP data received by the USB connector is transmitted to the DP connector through the USB interface circuit, the switching circuit and the DP interface circuit.

In an embodiment of the invention, the connection interface conversion device includes a USB connector, a DP connector and a connection interface conversion chip. The connection interface conversion chip includes a USB interface circuit, a DP interface circuit, a USB core circuit and a switching circuit. The USB interface circuit is suitable for coupling to a USB connector. The DP interface circuit is suitable for coupling to a DP connector. The USB core circuit is coupled to the USB interface circuit and the DP interface circuit. The switching circuit is coupled to the USB interface circuit and the DP interface circuit. In a first operation mode, at least one USB signal pair received by the USB connector is transmitted to the USB core circuit through the USB interface circuit. The USB core circuit decodes the USB signal pair and generates DP data. The DP data is transmitted to the DP connector by the DP interface circuit. In a second operation mode, the DP data received by the USB connector is transmitted to the DP connector through the USB interface circuit, the switching circuit and the DP interface circuit.

In an embodiment of the invention, the operation method includes: in a first operation mode, transmitting at least one USB signal pair received by the USB connector to the USB interface circuit, decoding the USB signal pair to generate DP data by the USB core circuit, and transmitting the DP data to the DP connector by the DP interface circuit; and in a second operation mode, transmitting the DP data received by the USB connector to the DP connector through the USB interface circuit, the switching circuit and the DP interface circuit.

Based on the above, in the above-mentioned embodiments, the switching circuit is configured in the connection interface conversion chip. When the signal of the USB connector is the signal compliant with the ALT mode of USB specification, the switching circuit can receive the DP data of the USB connector through the USB interface circuit, and (or) the USB core circuit can receive the USB signal of the USB connector through the USB interface circuit. Then, the switching circuit can transmit the DP data to the DP connector through the DP interface circuit. When the signal of the USB connector is the USB signal compliant with the DP Tunneling protocol of USB 4.0 specification, the USB core circuit can receive the USB signal of the USB connector through the USB interface circuit, and decode the USB signal to obtain the DP data. Then, the USB core circuit can transmit the DP data to the DP connector through the DP interface circuit. That is to say, because the switching circuit does not need to process high-bandwidth USB 4.0 signals, the cost of the switching circuit can be reduced as much as possible. The connection interface conversion chip (the connection interface conversion device) can process the signal of the USB connector, regardless of whether the signal of the USB connector is the signal of the ALT mode or the signal compliant with the DP tunneling protocol of USB 4.0.

To make the aforementioned more comprehensible, several embodiments accompanied with drawings are described in detail as follows.

DETAILED DESCRIPTION

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms such as "first", "second" and the like as recited in full text of the specification (including claims) are intended to give the elements names or distinguish different embodiments or scopes, and are not intended to limit an upper limit or a lower limit of the number of the elements nor limit an order of the elements. Moreover, wherever possible, elements/components/steps with same reference numerals represent same or similar parts in the drawings and embodiments. Elements/components/steps with the same reference numerals or names in different embodiments may be cross-referenced.

Figure 1:
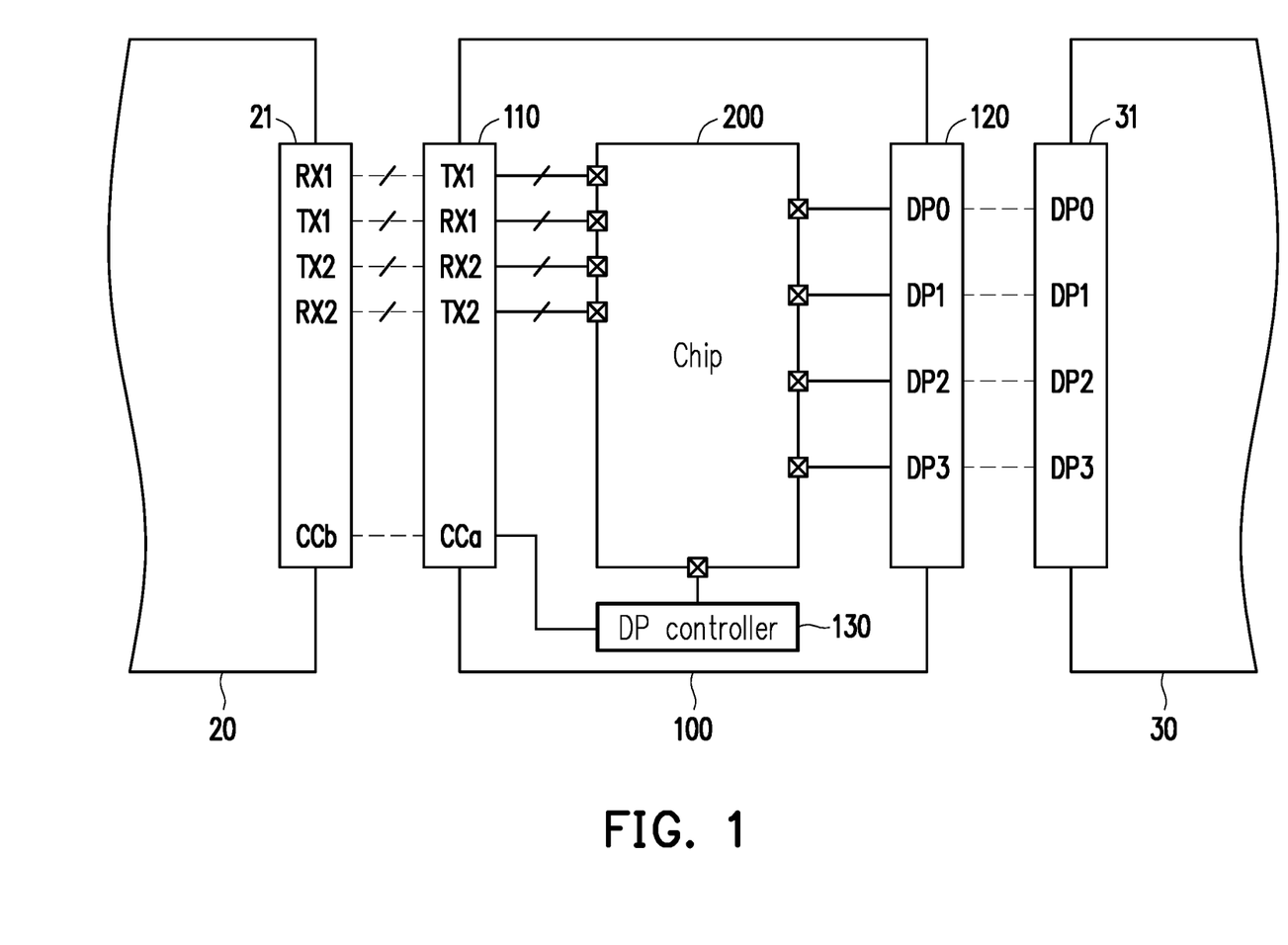
FIG. 1 is a circuit block diagram illustrating a connection interface conversion device connected between a host and a device according to an embodiment of the invention.

FIG. 1 is a circuit block diagram illustrating a connection interface conversion device 100 connected between a host 20 and a device 30 according to an embodiment of the invention. The connection interface conversion device 100 includes a display port (hereinafter, referred to as DP) connector 120. The DP connector 120 may include a channel pin pair DP0, a channel pin pair DP1, a channel pin pair DP2 and a channel pin pair DP3 specified by DP specification. The DP connector 120 may be connected to a DP connector 31 of the DP device 30 through a cable (or they may be directly connected together). The DP connector 31 may include a channel pin pair DP0, a channel pin pair DP1, a channel pin pair DP2 and a channel pin pair DP3 specified by DP specification. The connection interface conversion device 100 can serve as a source device, and the DP device 30 can serve as a sink device. According to application requirements, the DP device 30 may be a display or other DP devices.

The interface conversion device 100 further includes a universal serial bus (hereinafter, referred to as USB) connector 110. The USB connector 110 may be a USB Type-C connector (a.k.a. a USB-C connector). The USB connector 110 may include a transmitting pin (TX pin) pair TX1, a receiving pin (receiving pin, RX pin) pair RX1, a transmitting pin pair TX2, a receiving pin pair RX2, and a configuration channel (hereinafter, referred to as CC) pin CCa. The CC pin CCa may include a CC1 pin and (or) a CC2 pin specified by the USB specification.

The USB connector 110 may be connected to a USB connector 21 of the host 20 through a cable (or they may be directly connected together). The USB connector 21 may be a USB-C connector. The USB connector 21 may include a transmitting pin pair TX1, a receiving pin pair RX1, a transmitting pin pair TX2, a receiving pin pair RX2, and a configuration channel (hereinafter, referred to as CC) pin CCb. The CC pin CCb may include a CC1 pin and (or) a CC2 pin specified by the USB specification. According to application requirements, the host 20 may be a personal computer, a notebook computer, or other electronic devices with the USB-C connector.

The connection interface conversion device 100 further includes a connection interface conversion chip 200 and a power delivery (hereinafter referred to as PD) controller 130. The CC pin CCa of the USB connector 110 is coupled to the PD controller 130. When the USB connector 21 of the host 20 is connected to the USB connector 110, the PD controller 130 can detect a connection configuration of the USB connector 110 through the CC pin CCa. For instance, according to a detection result of the CC pin CCa, the PD controller 130 can know whether a USB plug (not shown) of the host 20 is inserted into the USB connector 110 with a front side facing up or inserted into the USB connector 110 with a back side facing up.

According to different application scenarios, the host 20 may be an electronic device compliant with USB 4.0 specification, or the host 20 may be an electronic device compliant with a display port alternative mode (a DP ALT Mode, hereinafter referred to as an ALT mode) of USB specification (e.g., the USB 3.2 specification). The PD controller 130 can also exchange configuration information with the host 20 via the CC pin CCa. Therefore, according to the configuration information of the CC pin CCa, the PD controller 130 can know whether the host 20 connected to the USB connector 110 is the electronic device compliant with USB 4.0 specification or the electronic device operating in the ALT mode. Related operations of PD (power transmission) control and the CC pin are specified in the USB specification, and thus not repeated herein. The PD controller 130 can provide a connection configuration signal to the connection interface conversion chip 200 according to the configuration information of the CC pin CCa. The connection interface conversion chip 200 dynamically determines whether to operate in a first operation mode, a second operation mode and (or) other operation modes according to the connection configuration signal provided by the PD controller 130. For instance, the first operation mode includes a DP tunneling protocol compliant with USB 4.0 specification, and the second operation mode includes a DP alternative mode (the ALT mode) compliant with USB specification.

According to different application scenarios, the host 20 may be the electronic device compliant with USB 4.0 specification. That is, a signal transmitted by the USB connector 21 of the host 20 is compliant with USB 4.0 specification. In the case where the USB connector 21 of the host 20 operates in USB 4.0 specification, the transmitting pin pair TX1 and the receiving pin pair RX1, the transmitting pin pair TX2 and the receiving pin pair RX2 of the USB connector 21 may all be used as the communication channel of USB 4.0. Accordingly, the transmitting pin pair TX1 and the transmitting pin pair TX2 of the USB connector 21 can transmit a USB 4.0 signal streaming to the receiving pin pair RX1 and the receiving pin pair RX2 of the USB connector 110 of the connection interface conversion device 100. When the USB connector 21 of the host 20 transmits the signal compliant with USB 4.0 specification, the host 20 can use the DP tunneling protocol compliant with USB 4.0 specification to encode the DP data compliant with DP specification and a AUX channel signal into the USB 4.0 signal streaming.

In the case where the USB connector 21 of the host 20 operates in USB 4.0 specification, the connection interface conversion chip 200 can correspondingly operates in the first operation mode. In the first operation mode (a USB 4.0 mode), the connection interface conversion chip 200 can decode at least one USB signal pair received by the receiving pin pair RX1 and the receiving pin pair RX2 of the USB connector 110 to generate the DP data compliant with DP specification. Accordingly, the connection interface conversion chip 200 can output the DP data to the DP device 30 through at least one of the channel pin pair DP0, the channel pin pair DP1, the channel pin pair DP2 and the channel pin pair DP3 of the DP connector 120.

According to different application scenarios, the host 20 may be the electronic device compliant with a display port alternative mode (an ALT mode) of USB specification (e.g., USB 3.2 specification). In the case where the USB connector 21 of the host 20 operates in USB 3.2 specification, one set of transmission channels of the USB connector 21 may be used as the communication channel of USB 3.2, whereas the other set of transmission channels of the USB connector 21 are idle. For instance, when the transmitting pin pair TX1 and the receiving pin pair RX1 of the USB connector 21 are used as the communication channel of the USB 3.2, the transmitting pin pair TX2 and the receiving pin pair RX2 of the USB connector 21 are idle. When the host operates in the ALT mode, the transmitting pin pair and the receiving pin pair which are idle in the USB connector 21 of the host 20 may be used to transmit the DP data compliant with DP specification.

In the case where the USB connector 21 of the host 20 operates in the ALT mode, the connection interface conversion chip 200 can correspondingly operates in the second operation mode. In the second operation (the ALT mode), when a USB plug (not shown) is inserted into the USB-C connector with a front side facing up, the connection interface conversion chip 200 can perform a bidirectional USB communication with the host 20 through the transmitting pin pair TX1 and the receiving pin pair RX1 of the USB connector 110, and the host 20 can transmit the DP data compliant with DP specification to the connection interface conversion chip 200 through at least one of the transmitting pin pair TX2 and the receiving pin pair RX2 of the USB connector 110. Conversely, when the USB plug (not shown) is inserted into the USB-C connector with a back side facing up, the connection interface conversion chip 200 can perform the bidirectional USB communication with the host 20 through the transmitting pin pair TX2 and the receiving pin pair RX2 of the USB connector 110, and the host 20 can transmit the DP data compliant with DP specification to the connection interface conversion chip 200 through at least one of the transmitting pin pair TX1 and the receiving pin pair RX1 of the USB connector 110. Accordingly, the connection interface conversion chip 200 can output the DP data to the DP device 30 through at least one of the channel pin pair DP0, the channel pin pair DP1, the channel pin pair DP2 and the channel pin pair DP3 of the DP connector 120.

Accordingly, the connection interface conversion device 100 is suitable for the interface conversion between the host 20 of different specifications and the DP device 30. The connection interface conversion device 100 (the connection interface conversion chip 200) can process the signal of the USB connector 110, regardless of whether the signal transmitted to the USB connector 110 by the host 20 is the signal in the first operation mode (the signal compliant with the DP tunneling protocol of USB 4.0) or the signal in the second operation mode (the ALT mode).

Figure 2:
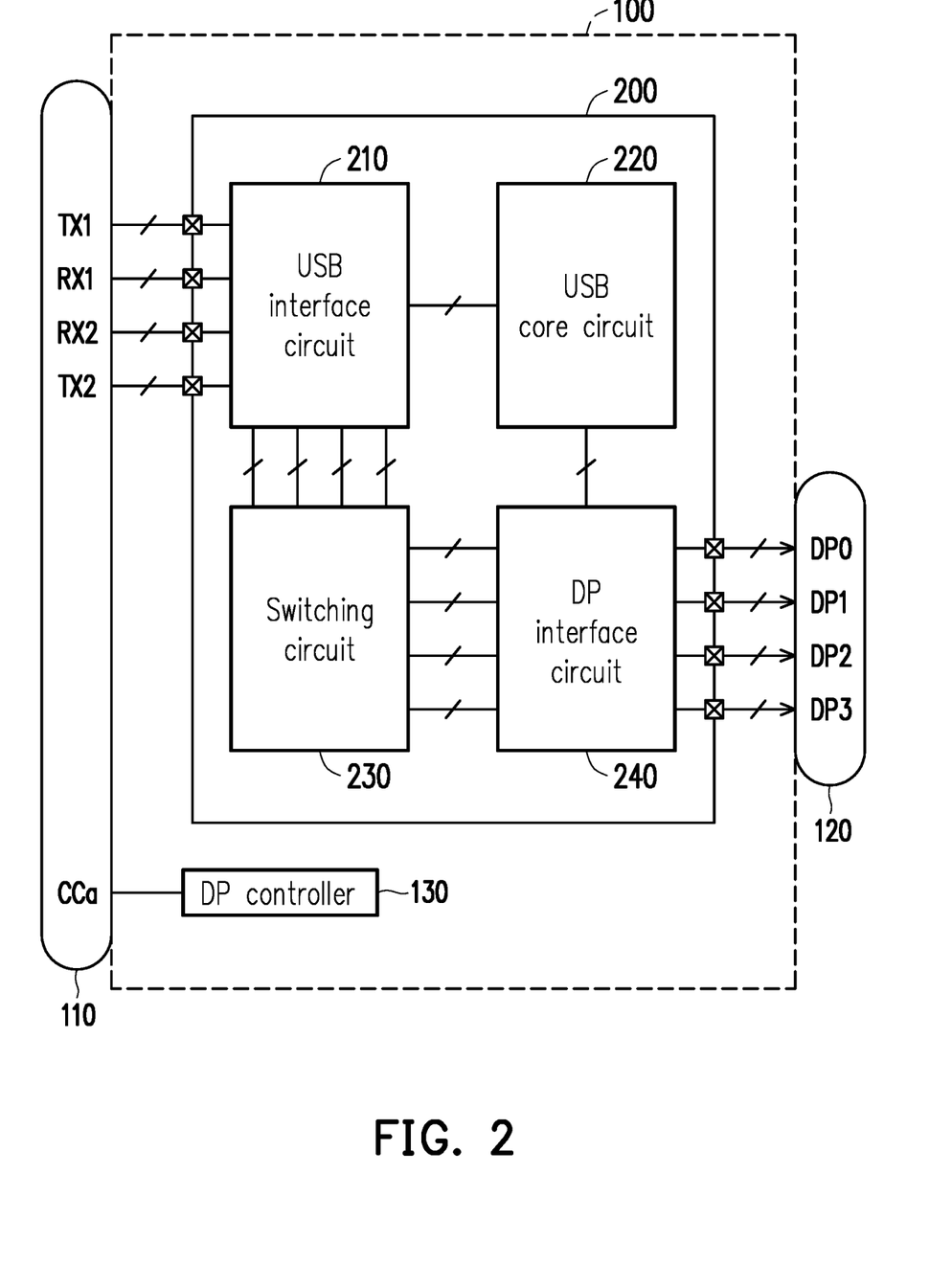
FIG. 2 is a circuit block diagram for describing a connection interface conversion chip illustrated in FIG. 1 according to an embodiment of the invention.

FIG. 2 is a circuit block diagram for describing the connection interface conversion chip 200 illustrated in FIG. 1 according to an embodiment of the invention. In the embodiment shown by FIG. 2, the connection interface conversion chip 200 includes a USB interface circuit 210, a USB core circuit 220, a switching circuit 230 and a DP interface circuit 240. The USB interface circuit 210 is suitable for coupling to the USB connector 110. For instance, the USB interface circuit 210 is suitable for at least coupling to the transmitting pin pair TX1, the receiving pin pair RX1, the transmitting pin pair TX2 and the receiving pin pair RX2 of the USB connector 110. The DP interface circuit 240 is suitable for coupling to the DP connector 120. For instance, the DP interface circuit 240 is suitable for at least coupling to the channel pin pair DP0, the channel pin pair DP1, the channel pin pair DP2 and the channel pin pair DP3 of the DP connector 120. The USB core circuit 220 is coupled to the USB interface circuit 210 and the DP interface circuit 240. The switching circuit 230 is coupled to the USB interface circuit 210 and the DP interface circuit 240. The USB connector 110, the DP connector 120, the PD controller 130 and the connection interface conversion chip 200 shown in FIG. 2 can refer to the related description of FIG. 1.

Figure 3:
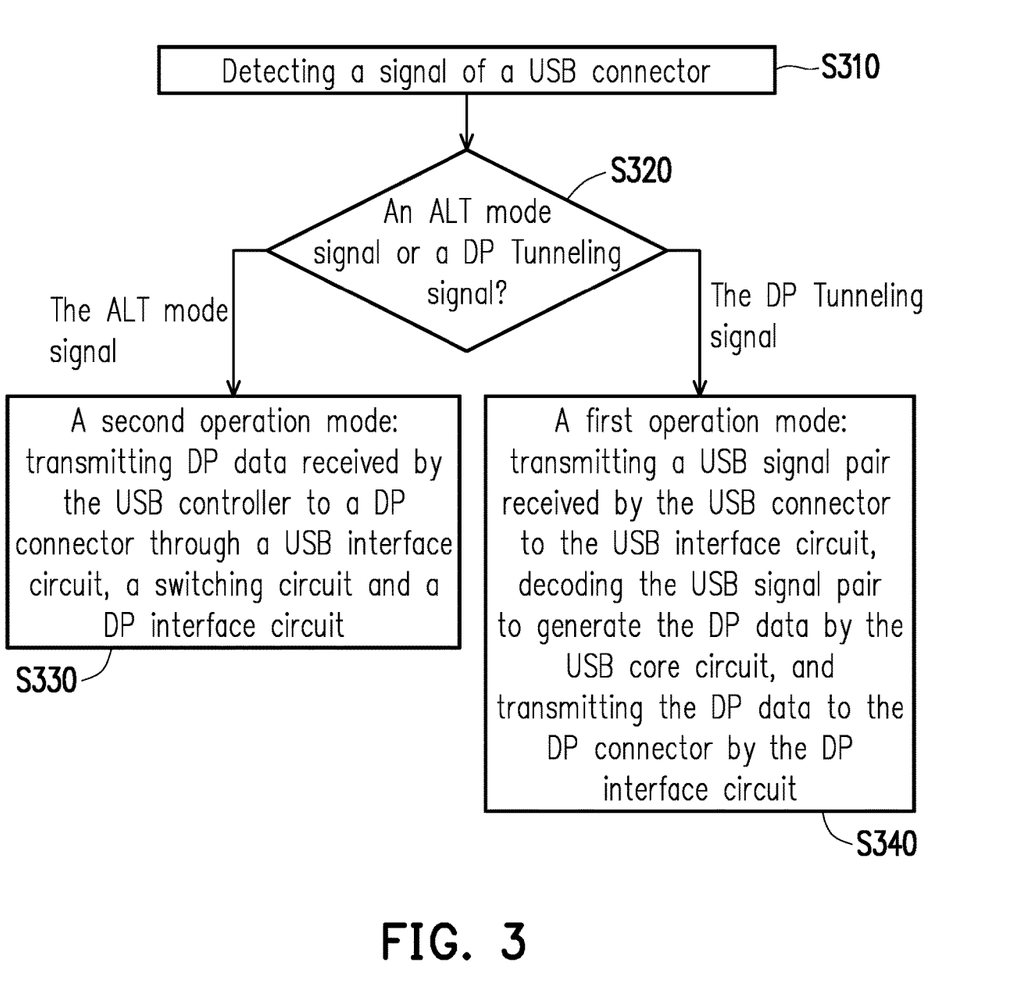
FIG. 3 is a flowchart of an operation method of a connection interface conversion chip according to an embodiment of the invention.

FIG. 3 is a flowchart of an operation method of a connection interface conversion chip according to an embodiment of the invention. Referring to FIG. 1, FIG. 2 and FIG. 3, in step S310, the DP controller 130 can detect the signal of the CC pin CCa of the USB connector 110, and exchange the configuration information with the host 20 via the CC pin CCa. Therefore, according to the configuration information of the CC pin CCa, the PD controller 130 and (or) the connection interface conversion chip 200 can know whether the host 20 connected to the USB connector 110 is the electronic device compliant with USB 4.0 specification or the electronic device operating in the ALT mode. According to design requirements, the USB core circuit 220 can perform a determination operation of step S320 That is, the USB core circuit 220 can determine whether the signal of the USB connector 110 is the signal of the ALT mode or the signal of the DP tunneling protocol according to the connection configuration signal provided by the PD controller 130.

When the signal of the USB connector 110 is determined as the signal of the ALT mode (a determination result of step S320 is "the ALT mode signal"), the connection interface conversion chip 200 can operate in the second operation mode. When the signal of the USB connector 110 is the signal of the ALT mode compliant with USB specification, the switching circuit 230 can receive the DP data of the USB connector 110 through the USB interface circuit 210, and (or) the USB core circuit 220 can receive the USB signal of the USB connector 110 through the USB interface circuit 210. Then, the switching circuit 230 can transmit the DP data to the DP connector 120 through the DP interface circuit 240. Accordingly, in the second operation mode (the ALT mode), the DP data received by the USB connector 110 is transmitted to the DP connector 120 through the USB interface circuit 210, the switching circuit 230 and the DP interface circuit 240 (step S330).

In other words, in the second operation mode (the ALT mode), USB data output by the USB core circuit 220 is transmitted the transmitting pin pair (e.g., the transmitting pin pair TX1) of the USB connector 110 through the USB interface circuit 210, and the USB data received from the host 20 by the receiving pin pair (e.g., the receiving pin pair RX1) of the USB connector 110 is transmitted to the USB core circuit 220 through the USB interface circuit 210. Therefore, the USB core circuit 220 can perform the bidirectional USB communication with the host 20 through the USB interface circuit 210 and the USB connector 110. The DP data received by at least one of the other transmitting pin pair (e.g., the transmitting pin pair TX2) and the other receiving pin pair (e.g., the receiving pin pair RX2) of the USB connector 110 is transmitted to at least one of the channel pin pair DP0, the channel pin pair DP1, the channel pin pair DP2 and the channel pin pair DP3 of the DP connector 120 through the USB interface circuit 210, the switching circuit 230 and the DP interface circuit 240.

In some application scenarios, the USB core circuit 220 may not need to perform the bidirectional USB communication with the host 20 in the ALT mode. That is to say, the USB core circuit 220 may not use the transmitting pin pair TX1, the receiving pin pair RX1, the transmitting pin pair TX2 and the receiving pin pair RX2 of the USB connector 110. In this case, the transmitting pin pair TX1, the receiving pin pair RX1, the transmitting pin pair TX2 and the receiving pin pair RX2 of the USB connector 110 may all be used to transmit the DP data. Accordingly, in the second operation mode (the ALT mode), the DP data received by the transmitting pin pair TX1, the receiving pin pair RX1, the transmitting pin pair TX2 and the receiving pin pair RX2 of the USB connector 110 may be transmitted to the channel pin pair DP0, the channel pin pair DP1, the channel pin pair DP2 and the channel pin pair DP3 of the DP connector 120 through the USB interface circuit 210, the switching circuit 230 and the DP interface circuit 240.

When the signal of the USB connector 110 is determined as the signal of the DP tunneling protocol of USB 4.0 (the determination result of step S320 is "the DP Tunneling signal"), the connection interface conversion chip 200 can operate in the first operation mode. When the signal of the USB connector 110 is the USB signal compliant with the DP tunneling protocol of USB 4.0 specification, the USB core circuit 220 can receive the USB signal pair of the USB connector 110 through the USB interface circuit 210, and decode the USB signal pair to obtain the DP data. Then, the USB core circuit 220 can transmit the DP data to the DP connector 120 through the DP interface circuit 240 (step S340). In other words, in the first operation mode, the USB signal pair received by the receiving pin pair RX1 and the receiving pin pair RX2 of the USB connector 110 is transmitted to the USB core circuit 220 through the USB interface circuit 210, the USB signal pair is decoded to generate the DP data by the USB core circuit 220, and the DP data is transmitted to at least one of the channel pin pair DP0, the channel pin pair DP1, the channel pin pair DP2 and the channel pin pair DP3 of the DP connector 120 by the DP interface circuit 240.

Accordingly, in the first operation mode (the USB 4.0 mode), the USB signal pair received by the USB connector 110 is transmitted to the USB core circuit 220 through the USB interface circuit 210, the USB signal pair is decoded to generate the DP data by the USB core circuit 220, and the DP data is transmitted to the DP connector 120 by the DP interface circuit 240. At this time (the first operation mode), the switching circuit 230 may be disabled according to design requirements to reduce power consumption. Because the switching circuit 230 does not need to process high-bandwidth USB 4.0 signals, the cost of the switching circuit 230 can be reduced as much as possible.

Figure 4:
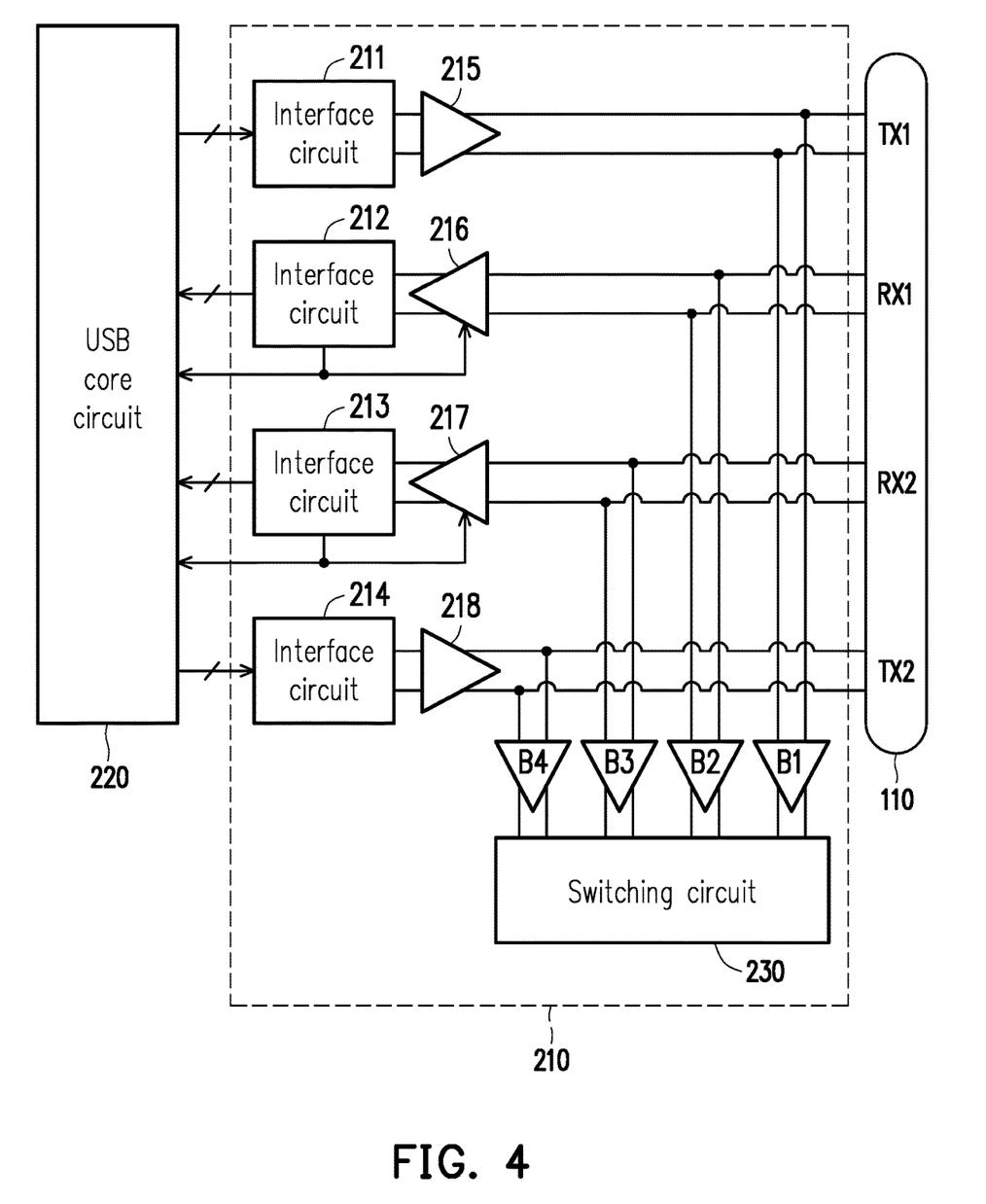
FIG. 4 is a circuit block diagram for describing a USB interface circuit illustrated in FIG. 2 according to an embodiment of the invention.

FIG. 4 is a circuit block diagram for describing the USB interface circuit 210 illustrated in FIG. 2 according to an embodiment of the invention. In the embodiment shown in FIG. 4, the USB interface circuit 210 includes an interface circuit 211, an interface circuit 212, an interface circuit 213, an interface circuit 214, a driver 215, a receiver 216, a receiver 217, a driver 218, a buffer B1, a buffer B2, a buffer B3 and a buffer B4. According to design requirements, the interface circuit 211 may include a parallel-in-serial-out (hereinafter, referred to as PISO) interface circuit and (or) other circuits. The USB data output by the USB core circuit 220 may be transmitted to an input terminal of the interface circuit 211. A differential input pair of the driver 215 is coupled to a differential output pair of the interface circuit 211 to receive a differential signal (the USB data). A differential output pair of the driver 215 is suitable for coupling to the transmitting pin pair TX1 of the USB connector 110.

A differential input pair of the receiver 216 is suitable for coupling to the receiving pin pair RX1 of the USB connector 110. A differential output pair of the receiver 216 is coupled to a differential input pair of the interface circuit 212. An output terminal of the interface circuit 212 is coupled to an input terminal of the USB core circuit 220. According to design requirements, the interface circuit 212 may include a clock and data recovery (hereinafter, referred to as CDR) circuit, a serial-in-parallel-out (hereinafter, referred to as SIPO) interface circuit, and (or) other circuits. The interface circuit 212 can adjust an equalization (hereinafter referred to as EQ) parameter of the receiver 216 according to the current signal quality. The interface circuit 212 can also provide the EQ parameter to the USB core circuit 220.

A differential input pair of the receiver 217 is suitable for coupling to the receiving pin pair RX2 of the USB connector 110. A differential output pair of the receiver 217 is coupled to a differential input pair of the interface circuit 213. An output terminal of the interface circuit 213 is coupled to an input terminal of the USB core circuit 220. According to design requirements, the interface circuit 213 may include the CDR circuit, the SIPO interface circuit and (or) other circuits. The interface circuit 213 can adjust the EQ parameter of the receiver 217 according to the current signal quality. The interface circuit 213 can also provide the EQ parameter to the USB core circuit 220.

According to design requirements, the interface circuit 214 may include the PISO interface circuit and (or) other circuits. The USB data output by the USB core circuit 220 may be transmitted to an input terminal of the interface circuit 214. A differential input pair of the driver 218 is coupled to a differential output pair of the interface circuit 214 to receive a differential signal (the USB data). A differential output pair of the driver 218 is suitable for coupling to the transmitting pin pair TX2 of the USB connector 110.

A differential input pair of the buffer B1 is suitable for coupling to the first transmitting pin pair TX1 of the USB connector 110. A differential output pair of the buffer B1 is coupled to the switching circuit 230. A differential input pair of the buffer B2 is suitable for coupling to the first receiving pin pair RX1 of the USB connector 110. A differential output pair of the buffer B2 is coupled to the switching circuit 230. A differential input pair of the buffer B3 is suitable for coupling to the receiving pin pair RX2 of the USB connector 110. A differential output pair of the buffer B3 is coupled to the switching circuit 230. A differential input pair of the buffer B4 is suitable for coupling to the transmitting pin pair TX2 of the USB connector 110. A differential output pair of the buffer B4 is coupled to the switching circuit 230.

In the first operation mode (the USB 4.0 mode), the USB core circuit 220 can disable the buffer B1, the buffer B2, the buffer B3 and the buffer B4. In the second operation mode (the ALT mode), the USB core circuit 220 can enable at least one of the buffer B1, the buffer B2, the buffer B3 and the buffer B4. For instance, it is assumed that the USB core circuit 220 performs the bidirectional USB communication with the host 20 by using the transmitting pin pair TX1 and the receiving pin pair RX1 of the USB connector 110. In this case, the USB core circuit 220 can disable the buffer B1 and the buffer B2 and enable the buffer B3 and the buffer B4 in the second operation mode (the ALT mode). It is assumed that the USB core circuit 220 performs the bidirectional USB communication with the host 20 by using the transmitting pin pair TX2 and the receiving pin pair RX2 of the USB connector 110. In this case, the USB core circuit 220 can disable the buffer B3 and the buffer B4 and enable the buffer B1 and the buffer B2 in the second operation mode (the ALT mode).

In some application scenarios, the USB core circuit 220 may not need to perform the bidirectional USB communication with the host 20 in the ALT mode. That is to say, the USB core circuit 220 may not use the transmitting pin pair TX1, the receiving pin pair RX1, the transmitting pin pair TX2 and the receiving pin pair RX2 of the USB connector 110. In this case, the USB core circuit 220 can enable the buffer B1, the buffer B2, the buffer B3 and the buffer B4 in the second operation mode (the ALT mode). In other modes (neither the USB 4.0 mode nor the ALT mode), the USB core circuit 220 can disable the buffer B1, the buffer B2, the buffer B3 and the buffer B4.

Figure 5:
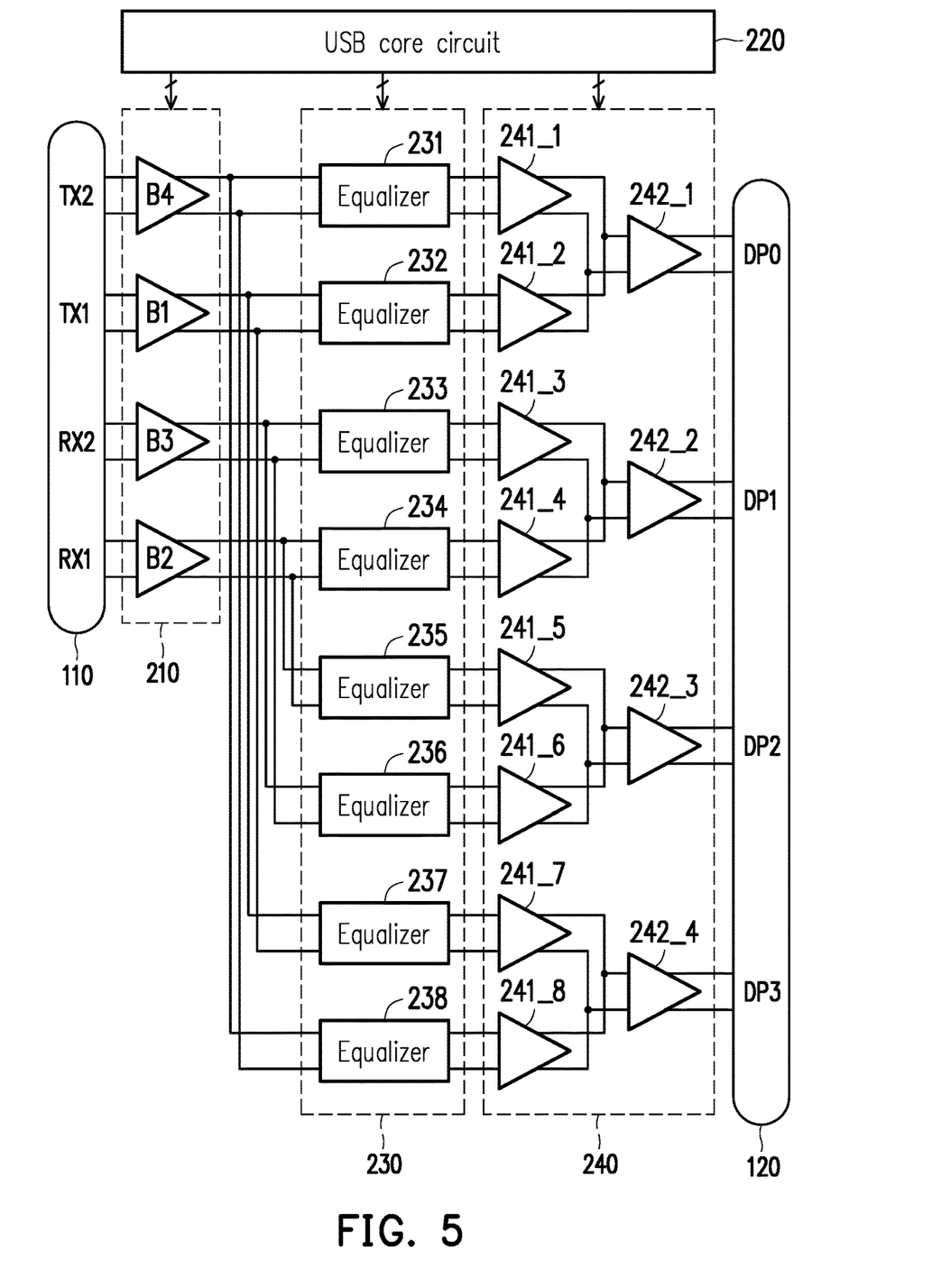
FIG. 5 is a circuit block diagram for describing a switching circuit and a DP interface circuit illustrated in FIG. 2 according to an embodiment of the invention.

FIG. 5 is a circuit block diagram for describing the switching circuit 230 and the DP interface circuit 240 illustrated in FIG. 2 according to an embodiment of the invention. In the embodiment shown in FIG. 5, the switching circuit 230 includes an equalizer 231, an equalizer 232, an equalizer 233, an equalizer 234, an equalizer 235, an equalizer 236, an equalizer 237 and an equalizer 238. According to the EQ parameters determined by the USB interface circuit 210, the USB core circuit 220 can correspondingly control/adjust the EQ parameters of the equalizers 231 to 238.

A differential input pair of the equalizer 231 is coupled to the differential output pair of the buffer B4. A differential input pair of the equalizer 232 is coupled to the differential output pair of the buffer B1. A differential input pair of the equalizer 233 is coupled to the differential output pair of the buffer B3. A differential input pair of the equalizer 234 is coupled to the differential output pair of the buffer B2. A differential input pair of the equalizer 235 is coupled to the differential output pair of the buffer B2. A differential input pair of the equalizer 236 is coupled to the differential output pair of the buffer B3. A differential input pair of the equalizer 237 is coupled to the differential output pair of the buffer B1. A differential input pair of the equalizer 238 is coupled to the differential output pair of the buffer B4.

In the embodiment shown in FIG. 5, the DP interface circuit 240 includes a pre-driver 241_1, a pre-driver 241_2, a pre-driver 241_3, a pre-driver 241_4, a pre-driver 241_5, a pre-driver 241_6, a pre-driver 241_7, a pre-driver 241_8, a driver 242_1, a driver 242_2, a driver 242_3 and a driver 242_4. A differential input pair of the pre-driver 241_1 is coupled to a differential output pair of the equalizer 231. A differential input pair of the pre-driver 241_2 is coupled to a differential output pair of the equalizer 232. A differential input pair of the pre-driver 241_3 is coupled to a differential output pair of the equalizer 233. A differential input pair of the pre-driver 241_4 is coupled to a differential output pair of the equalizer 234. A differential input pair of the pre-driver 241_5 is coupled to a differential output pair of the equalizer 235. A differential input pair of the pre-driver 241_6 is coupled to a differential output pair of the equalizer 236. A differential input pair of the pre-driver 241_7 is coupled to a differential output pair of the equalizer 237. A differential input pair of the pre-driver 241_8 is coupled to a differential output pair of the equalizer 238.

A differential input pair of the driver 242_1 is coupled to a differential output pair of the pre-driver 241_1 and a differential output pair of the pre-driver 241_2. A differential output pair of the driver 242_1 is suitable for coupling to the channel pin pair DP0 of the DP connector 120. A differential input pair of the driver 242_2 is coupled to a differential output pair of the pre-driver 241_3 and a differential output pair of the pre-driver 241_4. A differential output pair of the driver 242_2 is suitable for coupling to the channel pin pair DP1 of the DP connector 120. A differential input pair of the driver 242_3 is coupled to a differential output pair of the pre-driver 241_5 and a differential output pair of the pre-driver 241_6. A differential output pair of the driver 242_3 is suitable for coupling to the channel pin pair DP2 of the DP connector 120. A differential input pair of the driver 242_4 is coupled to a differential output pair of the pre-driver 241_7 and a differential output pair of the pre-driver 241_8. A differential output pair of the driver 242_4 is suitable for coupling to the channel pin pair DP3 of the DP connector 120.

In the first operation mode (the USB 4.0 mode), the USB core circuit 220 can disable the buffers B1 to B4, the equalizers 231 to 238 and the pre-drivers 241_1 to 241_8. In the second operation (the ALT mode), when a USB-C plug (not shown) is inserted into the USB connector 110 with a front side facing up, the USB core circuit 220 can disable the equalizer 232, the pre-driver 241_2, the equalizer 234, the pre-driver 241_4, the equalizer 236, the pre-driver 241_6, the equalizer 238 and the pre-driver 241_8. When the USB-C plug (not shown) is inserted into the USB connector 110 with a back side facing up, the USB core circuit 220 can disable the equalizer 231, the pre-driver 241_1, the equalizer 233, the pre-driver 241_3, the equalizer 235, the pre-driver 241_5, the equalizer 237 and the pre-driver 241_7.

In the case where the equalizer 232, the equalizer 234, the equalizer 236 and the equalizer 238 are disabled, the USB core circuit 220 can enable at least one of the equalizer 231, the equalizer 233, the equalizer 235 and the equalizer 237 in the second operation mode (the ALT mode). For instance, it is assumed that the USB core circuit 220 performs the bidirectional USB communication with the host 20 by using the transmitting pin pair TX1 and the receiving pin pair RX1 of the USB connector 110. In this case, the USB core circuit 220 can disable the buffer B1, the buffer B2, the equalizer 235, the equalizer 237, the pre-driver 241_5 and the pre-driver 241_7 and enable the buffer B3, the buffer B4, the equalizer 231, the equalizer 233, the pre-driver 241_1 and the pre-driver 241_3 in the second operation mode (the ALT mode). It is assumed that the USB core circuit 220 performs the bidirectional USB communication with the host 20 by using the transmitting pin pair TX2 and the receiving pin pair RX2 of the USB connector 110. In this case, the USB core circuit 220 can disable the buffer B3, the buffer B4, the equalizer 231, the equalizer 233, the pre-driver 241_1 and the pre-driver 241_3 and enable the buffer B1, the buffer B2, the equalizer 235, the equalizer 237, the pre-driver 241_5 and the pre-driver 241_7 in the second operation mode (the ALT mode).

In the case where the equalizer 231, the equalizer 233, the equalizer 235 and the equalizer 237 are disabled, the USB core circuit 220 can enable at least one of the equalizer 232, the equalizer 234, the equalizer 236 and the equalizer 238 in the second operation mode (the ALT mode). For instance, it is assumed that the USB core circuit 220 performs the bidirectional USB communication with the host 20 by using the transmitting pin pair TX1 and the receiving pin pair RX1 of the USB connector 110. In this case, the USB core circuit 220 can disable the buffer B1, the buffer B2, the equalizer 232, the equalizer 234, the pre-driver 241_2 and the pre-driver 241_4 and enable the buffer B3, the buffer B4, the equalizer 236, the equalizer 238, the pre-driver 241_6 and the pre-driver 241_8 in the second operation mode (the ALT mode). It is assumed that the USB core circuit 220 performs the bidirectional USB communication with the host 20 by using the transmitting pin pair TX2 and the receiving pin pair RX2 of the USB connector 110. In this case, the USB core circuit 220 can disable the buffer B3, the buffer B4, the pre-driver 241_1, the pre-driver 241_3, the equalizer 236, the equalizer 238, the pre-driver 241_6 and the pre-driver 241_8 and enable the buffer B1, the buffer B2, the equalizer 232, the equalizer 234, the pre-driver 241_2 and the pre-driver 241_4 in the second operation mode (the ALT mode).

In some application scenarios, the USB core circuit 220 may not need to perform the bidirectional USB communication with the host 20 in the ALT mode. That is to say, the USB core circuit 220 may not use the transmitting pin pair TX1, the receiving pin pair RX1, the transmitting pin pair TX2 and the receiving pin pair RX2 of the USB connector 110. In the case where the USB core circuit 220 does not use the transmitting pin pair TX1, the receiving pin pair RX1, the transmitting pin pair TX2 and the receiving pin pair RX2 and the equalizer 232, the equalizer 234, the equalizer 236 and the equalizer 238 are disabled, the USB core circuit 220 can enable the buffer B1, the buffer B2, the buffer B3, the buffer B4, the equalizer 231, the equalizer 233, the equalizer 235, the equalizer 237, the pre-driver 241_1, the pre-driver 241_3, the pre-driver 241_5 and the pre-driver 241_7 in the second operation mode (the ALT mode). In the case where the USB core circuit 220 does not use the transmitting pin pair TX1, the receiving pin pair RX1, the transmitting pin pair TX2 and the receiving pin pair RX2 and the equalizer 231, the equalizer 233, the equalizer 235 and the equalizer 237 are disabled, the USB core circuit 220 can enable the buffer B1, the buffer B2, the buffer B3, the buffer B4, the equalizer 232, the equalizer 234, the equalizer 236, the equalizer 238, the pre-driver 241_2, the pre-driver 241_4, the pre-driver 241_6 and the pre-driver 241_8 in the second operation mode (the ALT mode).

In other modes (neither the USB 4.0 mode nor the ALT mode), the USB core circuit 220 can disable the buffer B1, the buffer B2, the buffer B3, the buffer B4, the equalizers 231 to 238 and the pre-drivers 241_1 to 241_8.

Based on the different design requirements, the blocks of the USB interface circuit 210, the USB core circuit 220, the switching circuit 230 and (or) the DP interface circuit 240 may be implemented in form of hardware, firmware, software or a combination of multiples among the three.

In form of hardware, the blocks of the USB interface circuit 210, the USB core circuit 220, the switching circuit 230 and (or) the DP interface circuit 240 may be implemented as logic circuits on an integrated circuit. The related functions of the USB interface circuit 210, the USB core circuit 220, the switching circuit 230 and (or) the DP interface circuit 240 may be implemented as hardware using hardware description languages (e.g., Verilog HDL or VHDL) or other suitable programming languages. For instance, the related functions of the USB interface circuit 210, the USB core circuit 220, the switching circuit 230 and (or) the DP interface circuit 240 may be implemented as various logic blocks, modules and circuits in one or more controllers, microcontrollers, microprocessors, application-specific integrated circuits (ASIC), digital signal processors (DSP), field programmable gate arrays (FPGA) and/or other processing units.

In form of software/firmware, the related functions of the USB interface circuit 210, the USB core circuit 220, the switching circuit 230 and (or) the DP interface circuit 240 may be implemented as programming codes. For example, the USB interface circuit 210, the USB core circuit 220, the switching circuit 230 and (or) the DP interface circuit 240 may be implemented using common programming languages (e.g., C or C++) or other suitable programming languages. The programming codes may be recorded/stored in a recording medium. The recording medium includes, for example, a read only memory (ROM), a storage device and/or a random access memory (RAM). A computer, a central processing unit (CPU), a controller, a microcontroller or a microprocessor can read and execute the programming codes from the recording medium to achieve the related functions. A "non-transitory computer readable medium" (including a tape, a disk, a card, a semiconductor memory, a programmable logic circuits, etc.) may be used as the recording medium. Moreover, the programming codes may also be provided to the computer (or the CPU) via any transmission medium (a communication network or a broadcast wave). The communication network is, for example, Internet, a wired communication, a wireless communication or other communication media.

To sum up, in the above-mentioned embodiments, the switching circuit 230 is configured in the connection interface conversion chip 200. When the signal of the USB connector 110 is the signal of the ALT mode compliant with USB specification, the switching circuit 230 can receive the DP data of the USB connector 110 through the USB interface circuit 210, and (or) the USB core circuit 220 can receive the USB signal of the USB connector 110 through the USB interface circuit 110. Then, the switching circuit 230 can transmit the DP data to the DP connector 120 through the DP interface circuit 240. When the signal of the USB connector 110 is the USB signal of the DP tunneling protocol compliant with USB 4.0 specification, the USB core circuit 220 can receive the at least one USB signal pair of the USB connector 110 through the USB interface circuit 210, and decode the USB signal pair to obtain the DP data. Then, the USB core circuit 220 can transmit the DP data to the DP connector 120 through the DP interface circuit 240. That is to say, because the switching circuit 230 does not need to process high-bandwidth USB 4.0 signals, the cost of the switching circuit 230 can be reduced as much as possible. The connection interface conversion chip 200 (the connection interface conversion device 100) can process the signal of the USB connector 110, regardless of whether the signal of the USB connector 110 is the signal of the ALT mode or the signal of the DP tunneling protocol compliant with USB 4.0.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. A connection interface conversion chip, comprising:
   a universal serial bus interface circuit, suitable for coupling to a universal serial bus connector;
   a display port interface circuit, coupled to a display port sink device through a display port connector;
   a universal serial bus core circuit, coupled to the universal serial bus interface circuit and the display port interface circuit; and
   a switching circuit, coupled to the universal serial bus interface circuit and the display port interface circuit, wherein the switching circuit supports only one specific conduction mode that only allows transmitting display port signals between the universal serial bus interface circuit and the display port interface circuit no matter whether the switching circuit is reconfigured,
   wherein in a first operation mode, at least one universal serial bus signal pair received by the universal serial bus connector is transmitted to the universal serial bus core circuit through the universal serial bus interface circuit, the at least one universal serial bus signal pair is decoded to generate a first display port data by the universal serial bus core circuit, and the first display port data is transmitted to the display port connector by the display port interface circuit; and
   wherein in a second operation mode, at least one second display port data received by the universal serial bus connector is transmitted to the display port connector through the universal serial bus interface circuit, the switching circuit and the display port interface circuit.

2. The connection interface conversion chip of claim 1, wherein the universal serial bus connector comprises a USB-C connector.

3. The connection interface conversion chip of claim 1, wherein the first operation mode comprises a display port tunneling protocol compliant with USB 4.0 specification, and the second operation mode comprises a display port alternative mode compliant with USB specification.

4. The connection interface conversion chip of claim 1, wherein the switching circuit is disabled in the first operation mode.

5. The connection interface conversion chip of claim 1, wherein the universal serial bus interface circuit is suitable for at least coupling to a first transmitting pin pair, a first receiving pin pair, a second transmitting pin pair and a second receiving pin pair of the universal serial bus connector, and the display port interface circuit is suitable for at least coupling to a first channel pin pair, a second channel pin pair, a third channel pin pair and a fourth channel pin pair of the display port connector.

6. The connection interface conversion chip of claim 5, wherein in the first operation mode, the universal serial bus signal pair received by the first receiving pin pair and the second receiving pin pair of the universal serial bus connector is transmitted to the universal serial bus core circuit through the universal serial bus interface circuit, the universal serial bus signal pair is decoded to generate the first display port data by the universal serial bus core circuit, and the first display port data is transmitted to at least one of the first channel pin pair, the second channel pin pair, the third channel pin pair and the fourth channel pin pair of the display port connector by the display port interface circuit.

7. The connection interface conversion chip of claim 5, wherein in the second operation mode, the at least one second display port data received by the first transmitting pin pair, the first receiving pin pair, the second transmitting pin pair and the second receiving pin pair of the universal serial bus connector is transmitted to the first channel pin pair, the second channel pin pair, the third channel pin pair and the fourth channel pin pair of the display port connector through the universal serial bus interface circuit, the switching circuit and the display port interface circuit.

8. The connection interface conversion chip of claim 5, wherein in the second operation mode, first universal serial bus data output by the universal serial bus core circuit is transmitted to the first transmitting pin pair of the universal serial bus connector through the universal serial bus interface circuit, second universal serial bus data received by the first receiving pin pair of the universal serial bus connector is transmitted to the universal serial bus core circuit through the universal serial bus interface circuit, and the at least one second display port data received by at least one of the second transmitting pin pair and the second receiving pin pair of the universal serial bus connector is transmitted to at least one of the first channel pin pair, the second channel pin pair, the third channel pin pair and the fourth channel pin pair of the display port connector through the universal serial bus interface circuit, the switching circuit and the display port interface circuit.

9. The connection interface conversion chip of claim 5, wherein the universal serial bus interface circuit comprises:
   a first driver, having a differential output pair suitable for coupling to the first transmitting pin pair of the universal serial bus connector;
   a first receiver, having a differential input pair suitable for coupling to the first receiving pin pair of the universal serial bus connector;
   a second driver, having a differential output pair suitable for coupling to the second transmitting pin pair of the universal serial bus connector;
   a second receiver, having a differential input pair suitable for coupling to the second receiving pin pair of the universal serial bus connector;
   a first buffer, having a differential input pair suitable for coupling to the first transmitting pin pair of the universal serial bus connector;
   a second buffer, having a differential input pair suitable for coupling to the first receiving pin pair of the universal serial bus connector;
   a third buffer, having a differential input pair suitable for coupling to the second receiving pin pair of the universal serial bus connector; and
   a fourth buffer, having a differential input pair suitable for coupling to the second transmitting pin pair of the universal serial bus connector.

10. The connection interface conversion chip of claim 9, wherein the first buffer, the second buffer, the third buffer and the fourth buffer are disabled in the first operation mode.

11. The connection interface conversion chip of claim 9, wherein at least one of the first buffer, the second buffer, the third buffer and the fourth buffer is enabled in the second operation mode.

12. The connection interface conversion chip of claim 9, wherein the switching circuit comprises:
   a first equalizer, having a differential input pair coupled to a differential output pair of the fourth buffer;
   a second equalizer, having a differential input pair coupled to a differential output pair of the first buffer;
   a third equalizer, having a differential input pair coupled to a differential output pair of the third buffer;
   a fourth equalizer, having a differential input pair coupled to a differential output pair of the second buffer;
   a fifth equalizer, having a differential input pair coupled to the differential output pair of the second buffer;
   a sixth equalizer, having a differential input pair coupled to the differential output pair of the third buffer;
   a seventh equalizer, having a differential input pair coupled to the differential output pair of the first buffer; and
   an eighth equalizer, having a differential input pair coupled to the differential output pair of the fourth buffer.

13. The connection interface conversion chip of claim 12, wherein the first equalizer, the second equalizer, the third equalizer, the fourth equalizer, the fifth equalizer, the sixth equalizer, the seventh equalizer and the eighth equalizer are disabled in the first operation mode.

14. The connection interface conversion chip of claim 12, wherein in the second operation mode, the first equalizer, the third equalizer, the fifth equalizer and the seventh equalizer are disabled, or the second equalizer, the fourth equalizer, the sixth equalizer and the eighth equalizer are disabled.

15. The connection interface conversion chip of claim 12, wherein
   in the second operation mode where the first equalizer, the third equalizer, the fifth equalizer and the seventh equalizer are disabled, the second equalizer, the fourth equalizer, the sixth equalizer and the eighth equalizer are enabled; and
   in the second operation mode where the second equalizer, the fourth equalizer, the sixth equalizer and the eighth equalizer are disabled, the first equalizer, the third equalizer, the fifth equalizer and the seventh equalizer are enabled.

16. The connection interface conversion chip of claim 12, wherein
   in the second operation mode where the first equalizer, the third equalizer, the fifth equalizer and the seventh equalizer are disabled, the second equalizer and the fourth equalizer are disabled, and the sixth equalizer and the eighth equalizer are enabled; and
   in the second operation mode where the second equalizer, the fourth equalizer, the sixth equalizer and the eighth equalizer are disabled, the first equalizer and the third equalizer are enabled, and the fifth equalizer and the seventh equalizer are disabled.

17. The connection interface conversion chip of claim 12, wherein the display port interface circuit comprises:
   a first pre-driver, having a differential input pair coupled to a differential output pair of the first equalizer;
   a second pre-driver, having a differential input pair coupled to a differential output pair of the second equalizer;
   a third pre-driver, having a differential input pair coupled to a differential output pair of the third equalizer;
   a fourth pre-driver, having a differential input pair coupled to a differential output pair of the fourth equalizer;
   a fifth pre-driver, having a differential input pair coupled to a differential output pair of the fifth equalizer;
   a sixth pre-driver, having a differential input pair coupled to a differential output pair of the sixth equalizer;
   a seventh pre-driver, having a differential input pair coupled to a differential output pair of the seventh equalizer;
   an eighth pre-driver, having a differential input pair coupled to a differential output pair of the eighth equalizer;
   a third driver, having a differential input pair coupled to a differential output pair of the first pre-driver and a differential output pair of the second pre-driver, wherein a differential output pair of the third driver is suitable for coupling to the first channel pin pair of the display port connector;
   a fourth driver, having a differential input pair coupled to a differential output pair of the third pre-driver and a differential output pair of the fourth pre-driver, wherein a differential output pair of the fourth driver is suitable for coupling to the second channel pin pair of the display port connector;

a fifth driver, having a differential input pair coupled to a differential output pair of the fifth pre-driver and a differential output pair of the sixth pre-driver, wherein a differential output pair of the fifth driver is suitable for coupling to the third channel pin pair of the display port connector; and a sixth driver, having a differential input pair coupled to a differential output pair of the seventh pre-driver and a differential output pair of the eighth pre-driver, wherein a differential output pair of the sixth driver is suitable for coupling to the fourth channel pin pair of the display port connector.

18. A connection interface conversion device, comprising:
a universal serial bus connector;
a display port connector; and
a connection interface conversion chip, comprising:
  a universal serial bus interface circuit, suitable for coupling to the universal serial bus connector;
  a display port interface circuit, coupled to a display port sink device through a display port connector;
  a universal serial bus core circuit, coupled to the universal serial bus interface circuit and the display port interface circuit; and
  a switching circuit, coupled to the universal serial bus interface circuit and the display port interface circuit, wherein the switching circuit supports only one specific conduction mode that only allows transmitting display port signals between the universal serial bus interface circuit and the display port interface circuit no matter whether the switching circuit is reconfigured,
wherein in a first operation mode, at least one universal serial bus signal pair received by the universal serial bus connector is transmitted to the universal serial bus core circuit through the universal serial bus interface circuit, the at least one universal serial bus signal pair is decoded to generate a first display port data by the universal serial bus core circuit, and the first display port data is transmitted to the display port connector by the display port interface circuit; and
wherein in a second operation mode, at least one second display port data received by the universal serial bus connector is transmitted to the display port connector through the universal serial bus interface circuit, the switching circuit and the display port interface circuit.

19. An operation method of a connection interface conversion chip, the connection interface conversion chip comprising a universal serial bus interface circuit, a display port interface circuit, a universal serial bus core circuit and a switching circuit, the universal serial bus interface circuit being suitable for coupling to a universal serial bus connector, the display port interface circuit being s coupled to a display port sink device through a display port connector, the operation method comprising:
in a first operation mode, transmitting at least one universal serial bus signal pair received by the universal serial bus connector to the universal serial bus core circuit through the universal serial bus interface circuit, decoding the at least one universal serial bus signal pair to generate a first display port data by the universal serial bus core circuit, and transmitting the first display port data to the display port connector by the display port interface circuit; and in a second operation mode, transmitting at least one second display port data received by the universal serial bus connector to the display port connector through the universal serial bus interface circuit, the switching circuit and the display port interface circuit, wherein the switching circuit supports only one specific conduction mode that only allows transmitting display port signals between the universal serial bus interface circuit and the display port interface circuit no matter whether the switching circuit is reconfigured.

20. The operation method of claim 19, wherein the universal serial bus connector comprises a USB-C connector.

21. The operation method of claim 19, wherein the first operation mode comprises a display port tunneling protocol compliant with USB 4.0 specification, and the second operation mode comprises a display port alternative mode compliant with USB specification.

22. The operation method of claim 19, further comprising:
disabling the switching circuit in the first operation mode.

23. The operation method of claim 19, wherein the universal serial bus interface circuit is suitable for at least coupling to a first transmitting pin pair, a first receiving pin pair, a second transmitting pin pair and a second receiving pin pair of the universal serial bus connector, and the display port interface circuit is suitable for at least coupling to a first channel pin pair, a second channel pin pair, a third channel pin pair and a fourth channel pin pair of the display port connector.

24. The operation method of claim 23, further comprising:
in the first operation mode, transmitting the universal serial bus signal pair received by the first receiving pin pair and the second receiving pin pair of the universal serial bus connector to the universal serial bus core circuit through the universal serial bus interface circuit, decoding the universal serial bus signal pair to generate the first display port data by the universal serial bus core circuit, and transmitting the first display port data to at least one of the first channel pin pair, the second channel pin pair, the third channel pin pair and the fourth channel pin pair of the display port connector by the display port interface circuit.

25. The operation method of claim 23, further comprising:
in the second operation mode, transmitting the at least one second display port data received by the first transmitting pin pair, the first receiving pin pair, the second transmitting pin pair and the second receiving pin pair of the universal serial bus connector to the first channel pin pair, the second channel pin pair, the third channel pin pair and the fourth channel pin pair of the display port connector through the universal serial bus interface circuit, the switching circuit and the display port interface circuit.

26. The operation method of claim 23, further comprising:
in the second operation mode, transmitting first universal serial bus data output by the universal serial bus core circuit to the first transmitting pin pair of the universal serial bus connector through the universal serial bus interface circuit;
in the second operation mode, transmitting second universal serial bus data received by the first receiving pin pair of the universal serial bus connector to the universal serial bus core circuit through the universal serial bus interface circuit; and
in the second operation mode, transmitting the at least one second display port data received by at least one of the second transmitting pin pair and the second receiving pin pair of the universal serial bus connector to at least one of the first channel pin pair, the second channel pin pair, the third channel pin pair and the fourth channel pin pair of the display port connector through the universal serial bus interface circuit, the switching circuit and the display port interface circuit.

\* \* \* \* \*